(12) United States Patent
Williamson et al.

(10) Patent No.: US 7,163,625 B1
(45) Date of Patent: Jan. 16, 2007

(54) FILTRATION DEVICE

(75) Inventors: Bruce S. Williamson, Alpharetta, GA (US); Michael S. Brunner, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/712,085

(22) Filed: Nov. 14, 2000

Related U.S. Application Data

(60) Provisional application No. 60/171,032, filed on Dec. 16, 1999.

(51) Int. Cl.
*B01D 27/06* (2006.01)

(52) U.S. Cl. .......................... 210/315; 55/520; 96/154; 210/489; 210/494.1; 210/497.01; 210/502.1

(58) Field of Classification Search ............... 210/315, 210/317, 496, 497.1, 502.1, 505, 493.4, 494.1, 210/494.2, 497.01, 494.3, 497.2, 489; 55/520; 96/154

See application file for complete search history.

(56) References Cited

U.S. PATENT DOCUMENTS

| | | | |
|---|---|---|---|
| 1,656,455 A | * | 1/1928 | Tinello ........................ 210/437 |
| 3,209,916 A | * | 10/1965 | May et al. ................... 210/484 |
| 3,262,578 A | * | 7/1966 | Dennis ........................ 210/489 |
| 3,780,869 A | | 12/1973 | Krongos ...................... 210/317 |
| 4,001,120 A | | 1/1977 | Gelman et al. .............. 210/420 |
| 4,007,113 A | | 2/1977 | Ostreicher ................... 210/504 |
| 4,048,075 A | * | 9/1977 | Colvin et al. ................ 210/484 |
| 4,172,796 A | | 10/1979 | Corder ........................ 210/238 |
| 4,212,743 A | | 7/1980 | Van Meter et al. .......... 210/282 |
| 4,326,935 A | | 4/1982 | Moeglich ................ 204/180 P |
| 4,361,475 A | | 11/1982 | Moeglich ..................... 204/252 |
| 4,523,995 A | | 6/1985 | Pall et al. .................... 210/504 |
| 4,536,290 A | | 8/1985 | Bonazzo ...................... 210/419 |
| 4,753,728 A | | 6/1988 | VanderBilt et al. .......... 210/282 |
| 4,902,427 A | | 2/1990 | Szczepanik .................. 210/484 |
| 4,980,056 A | | 12/1990 | Norton ........................ 210/137 |

(Continued)

FOREIGN PATENT DOCUMENTS

GB            772354         4/1957

(Continued)

OTHER PUBLICATIONS

PCT International Search Report dated Sep. 28, 2001.

(Continued)

*Primary Examiner*—Ivars C. Cintins
(74) *Attorney, Agent, or Firm*—Dority & Manning

(57) ABSTRACT

The present invention provides a filtration device. The invention employs filter media wrapped into spirals about an apertured core. Fluid may flow radially inward or radially outward during filtration. Embodiments using multiple filter media and embodiments achieving a low pressure drop are also disclosed.

19 Claims, 4 Drawing Sheets

U.S. PATENT DOCUMENTS

| | | | |
|---|---|---|---|
| 5,017,286 A | 5/1991 | Heiligman | 210/266 |
| 5,122,270 A * | 6/1992 | Ruger et al. | 210/282 |
| 5,126,044 A | 6/1992 | Magnusson et al. | 210/282 |
| 5,213,688 A | 5/1993 | Robinson | 210/440 |
| 5,273,650 A | 12/1993 | Vermes et al. | 210/264 |
| 5,273,818 A * | 12/1993 | Kim et al. | 428/288 |
| 5,290,443 A | 3/1994 | Norton | 210/442 |
| 5,290,446 A | 3/1994 | Degan et al. | 210/489 |
| 5,510,031 A | 4/1996 | Knauf, Jr. et al. | 210/460 |
| 5,607,595 A * | 3/1997 | Hiasa et al. | 210/669 |
| 5,681,463 A | 10/1997 | Shimizu et al. | 210/266 |
| RE35,667 E | 11/1997 | Heiligman | 210/266 |
| 5,762,797 A * | 6/1998 | Patrick et al. | 210/497.1 |
| 6,000,558 A | 12/1999 | Proulx et al. | 210/486 |
| 6,391,200 B1 * | 5/2002 | Pulek et al. | 210/497.1 |

FOREIGN PATENT DOCUMENTS

| | | |
|---|---|---|
| WO | 9623571 | 8/1996 |
| WO | 9932212 | 7/1999 |

OTHER PUBLICATIONS

International Preliminary Examination Report, Dec. 6, 2001.
Taiwan Patent Publication No. 383,619 W/Translation, Mar. 1, 2000.
Taiwan Patent Publication No. 306,321 W/Translation, May 21, 1997.

* cited by examiner

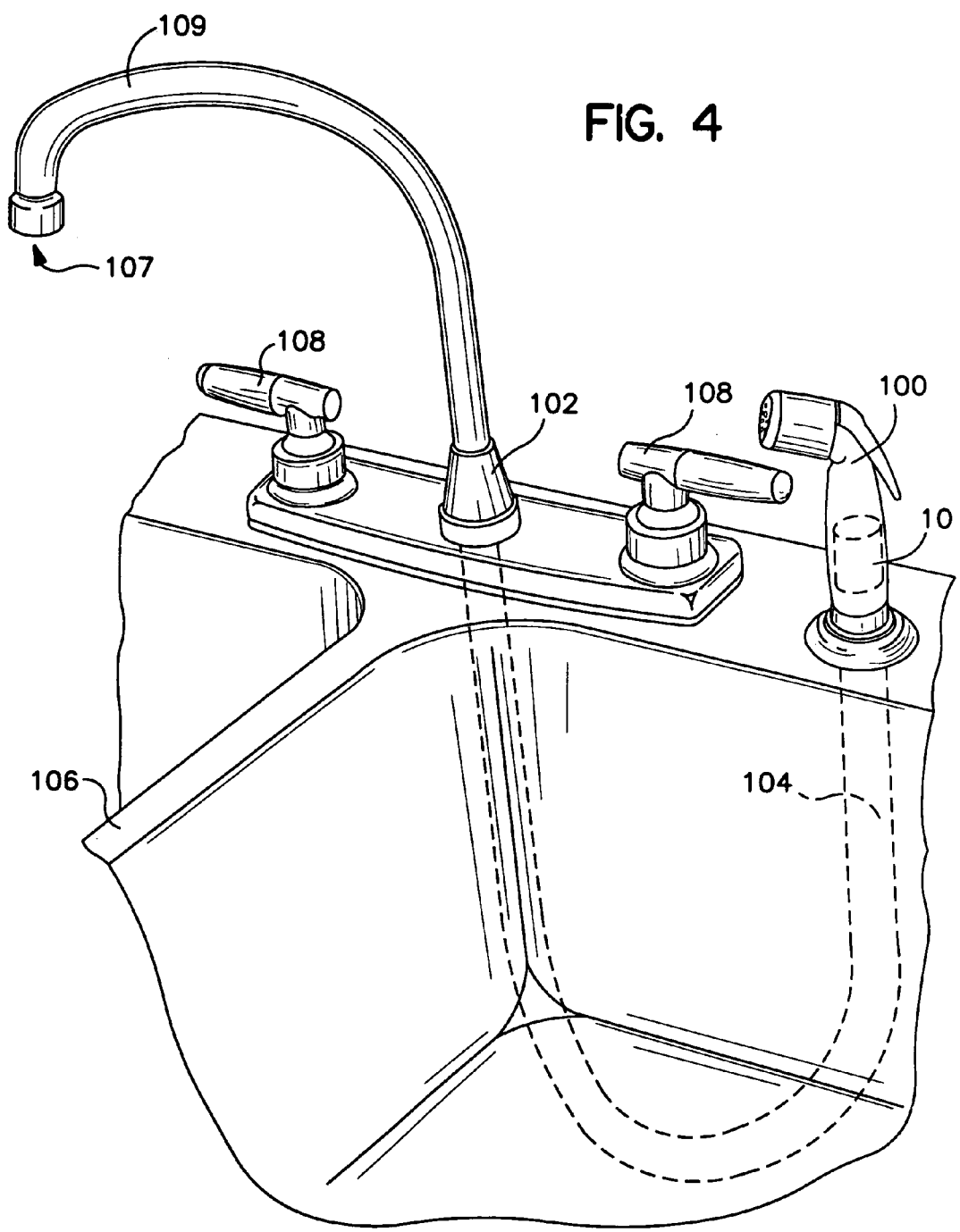

FILTRATION DEVICE

PRIORITY CLAIM

The present application hereby claims priority based on Provisional Application Ser. No. 60/171,032, filed Dec. 16, 1999.

FIELD OF THE INVENTION

The present invention relates to a filtration device. More specifically, the present invention relates to a fluid filter constructed from filter media that is wound in spiral fashion about an apertured core and that may be structured to achieve a low pressure drop and high efficiency during fluid filtration.

BACKGROUND OF THE INVENTION

Filters are used daily to remove constituents from a variety of fluids. Filter usage varies in scale and the nature of the application. For example, filters may be used in an automobile to remove undesired constituents from the fuel before the constituents damage the engine. Filters may be used by industry to recover a desired constituent from a fluid stream, such as the filtration of a process stream to recover an expensive catalyst. In addition, a fluid may be filtered to remove more than just one constituent. In such case, a filter with multiple stages or with multiple filter media, each capable of removing a different constituent, may be employed.

Filters are also used in the treatment of water intended for human consumption and use, where the water is expected to be either free of harmful constituents or contain concentrations of such constituents that are below harmful levels. To provide water for use in homes and businesses, municipalities may utilize industrial scale processes in an effort to eliminate or reduce harmful constituents present in water drawn from large, naturally occurring water sources. Water is also frequently obtained on a smaller scale from wells and springs and usually without any treatment prior to consumption.

Unfortunately, the cleanliness of a particular water supply is sometimes questionable. The consistency and efficiency of treatment by municipalities may vary due to numerous factors such as heavy rainfall, equipment failures, and usage levels. Depending upon the seriousness of a variation in treatment, a municipality may be forced to notify its users that further treatment of the water supplied, e.g. boiling, is required at the point-of-use before consumption or use is safe. Water obtained directly from a natural source may also become suspect depending upon environmental conditions near the source. Wells and springs can become contaminated due to rain water run-off washing a contaminant into the source.

Various fluid filtration devices have been developed. For example, in the area of water filtration, devices range from those located at the point-of-use (e.g. the spigot of a kitchen sink, gravity-flow dispensers such as water pitchers, and low-pressure dispensers such as sports bottles) to the generally bulkier point-of-entry units hidden from view within the plumbing of a home or office.

Current filtration devices may require a large pressure drop or residence time to operate effectively. For example, current industrial filters may require that the pressure of the unfiltered fluid supplied to the filter be at a certain level before the filter will produce filtered fluid at a rate that is practical. Similarly, current water filtration devices may require either a source of unfiltered water above an operable minimum pressure, or may require a lengthy residence time for the unfiltered water to flow through the filter.

Filters with a large pressure drop may be more expensive to use because of the energy required to pressurize the unfiltered fluid or because of the time spent during the filtration process. In addition, filters with a large pressure drop may cause the system in which they are installed to function improperly or less efficiently. For gravity flow systems, a large pressure drop filter may be inoperable under current technology. The installation of additional equipment or modifications of the existing system may be necessary to circumvent the pressure drop problem.

For example, point-of-use water filtration systems exist for installation with a conventional sink. These systems are generally installed under the sink or at the end of the faucet. Such systems may occupy space normally used for storage or, in the case of installations at the faucet end, may consume space needed while using the sink for cleaning, food preparation, and the like. Many conventional sinks include a water sprayer and installation of a filter into the sprayer could result in a savings of space. However, depending upon the pressure of water supplied to the sink, the water sprayer may not operate properly if a filter is used in conjunction with the water sprayer.

The faucet assembly of a conventional sink typically includes a shuttle valve within the assembly. When the water sprayer is activated, the shuttle valve operates by water pressure to direct water flow away from the faucet and to the water sprayer. However, if a water filter requiring a large pressure drop is added to the sprayer or the flexible conduit generally connecting the water sprayer to the faucet assembly, the shuttle valve may not operate to direct flow to the sprayer.

Therefore, a need exists for a fluid filter that may remove constituents from a fluid stream. More specifically, there exists a need for a fluid filter that may remove constituents from a fluid stream while occupying a minimum of space. Even more desirably, there exists a need for a fluid filter that also minimizes the pressure drop incurred during the filtration process.

SUMMARY OF THE INVENTION

The present invention is a directed to a filter created by winding filter media about an apertured core to create a filtration device with a spirally wound filter media. The filter media may also be structured to achieve a low pressure drop during fluid filtration. By varying the structure, order, and number of layers formed by wrapping the filter media, embodiments of the present invention may be tailored to meet specific applications and to remove specific undesired constituents in a prescribed order.

In addition, because of the low pressure drop across the filtration device that may be achieved with certain embodiments, the present invention has application beyond the scope of existing higher pressure drop filters. For example, as explained above, the faucet assembly provided with a conventional sink generally includes a shuttle valve within the faucet assembly. The shuttle valve serves to direct flow away from the faucet and to the water sprayer during use of the sprayer. However, unless the existing water supply pressure is relatively high, the shuttle valve may not function properly when a high pressure drop filter is configured with the water sprayer. Embodiments of the present invention may be used in conjunction with a water sprayer to provide filtered water at a pressure drop that does not prevent the shuttle valve from operating properly. In addition, because of the low pressure drop achievable with certain embodiments, the present invention may be used in gravity flow systems where the current technology may be inoperable or time consuming.

The present invention is not limited to water filtration. Rather, the filtration device may be used in any fluid filtration process. Moreover, for those filter applications requiring a low pressure drop filter and the ability to remove particular constituents, the present invention provides a novel solution.

In certain embodiments, a filtration device includes an unfiltered fluid inlet surface, through which unfiltered fluid may enter the filtration device. The unfiltered fluid inlet surface is in fluid communication with a first filter media. The first filter media is spirally wound around a core. The first filter media is positioned with respect to the unfiltered fluid inlet surface such that unfiltered fluid entering the filtration device through the unfiltered fluid inlet surface will flow radially inward and the through the first filter media.

The core, about which the first filter media is wound, may be cylindrically shaped and has a surface that defines apertures throughout the surface of the core. The apertures are spaced intermittently about the surface of the core so that filtered fluid from the first filter media may flow radially inward from the first filter media and into the core by flowing through the apertures. The core has a first end and a second end. The first end is open and in fluid communication with a filtered fluid outlet. The second end is closed to prevent the flow of fluid through the second end. Accordingly, filtered fluid from the apertures in the surface of the core may flow through the first end of the core and exit the filtration device through the filtered fluid outlet.

The present invention exists in various embodiments that may be practiced by those skilled in the art using the teachings found herein. By way of example only, additional filter media may be spirally wrapped around the first filter media. The filtration device may include as many additional filter media, wrapped in spiral fashion, as space and the available unfiltered fluid pressure will allow. Different filter media may be arranged in a specific order to effect filtration of several undesired constituents using a particular sequence. Also, an individual filter media may be wrapped several times in spiral fashion to create more than one layer of the individual filter media. In this fashion, the fluid must pass through multiple layers of the filter media as the fluid flows radially inward to the core.

The above described embodiments operate to filter a fluid moving from the outer surface of the filtration device to its core. However, the filtration device may also be used to filter a fluid that is introduced into the core of the filter such that the fluid flows radially outward within the filter towards the surface of the filter. As with the above, multiple layers of filter media may also be used with this embodiment to remove undesired constituents in a select sequence.

Various filter media may be used within the filtration device. The filter media must have sufficient flexibility to be wrapped in spiral fashion. Filter media, such as layers of, or laminates of, activated carbon, nonwovens, spunbonded webs, meltblown webs, and charge-modified materials, may be used in the present invention as described.

These and other features, aspects and advantages of the present invention will become better understood with reference to the following description and appended claims. The accompanying drawings, which are incorporated in and constitute a part of this specification, illustrate an embodiment of the invention and, together with the description, serve to explain the principles of the invention.

BRIEF DESCRIPTION OF THE DRAWINGS

FIG. 4 is a perspective and partial cross-sectional view of an embodiment of the present invention installed into the water sprayer attached to the faucet assembly of a conventional sink.

DETAILED DESCRIPTION OF THE PREFERRED EMBODIMENTS

Figure 1:
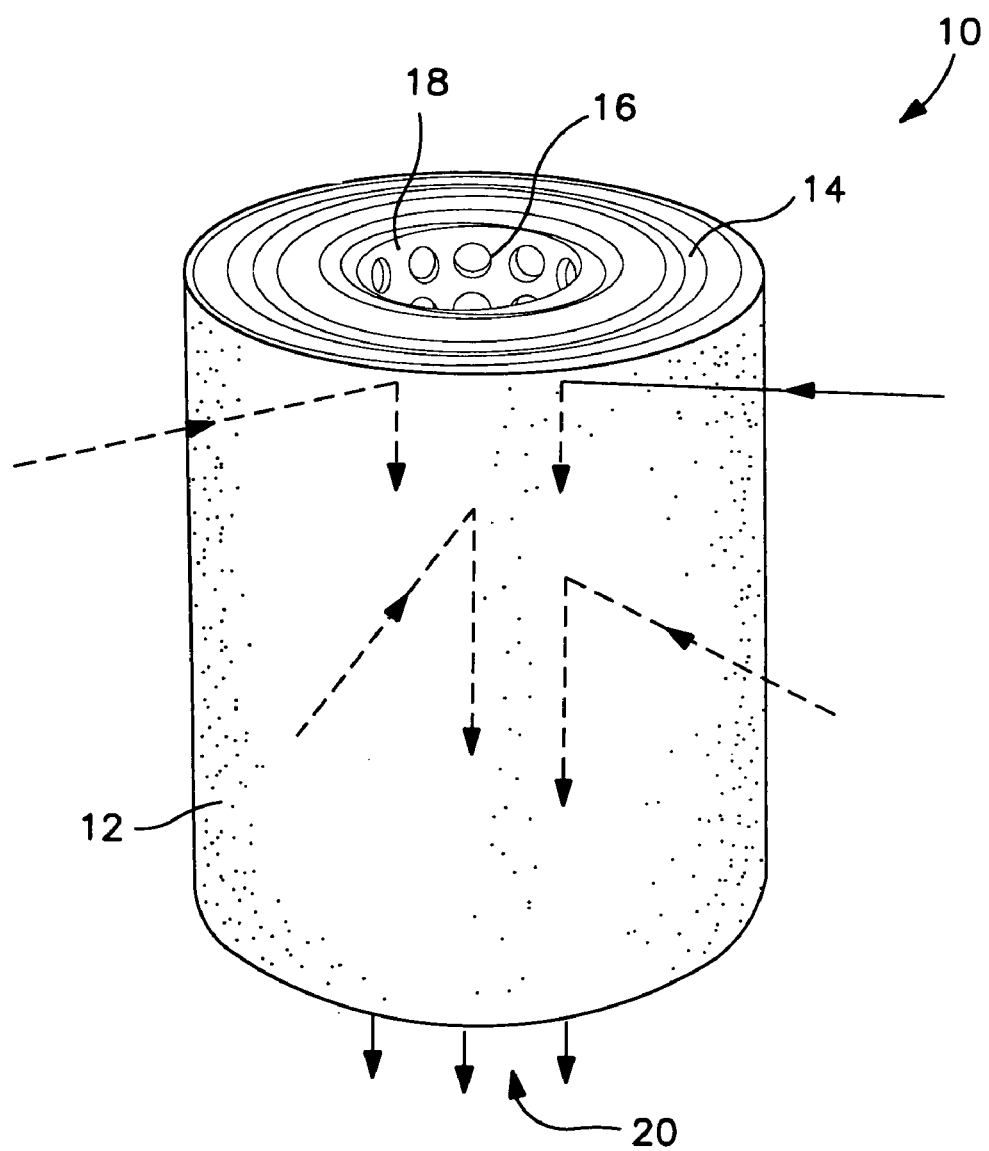
FIG. 1 is a perspective view of an embodiment of the present invention.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

As used herein, the words "faucet assembly" mean a typical valve assembly installed in a conventional sink that generally includes a mixing base containing a cold water valve, a hot water valve, a spigot, a water sprayer connected to the mixing base of the faucet assembly by a flexible conduit, and a shuttle valve for directing the flow of water to the water sprayer when it is activated. An exemplary faucet assembly is depicted in FIG. 4. A faucet assembly could be used to dispense a fluid other than water. This definition and the present invention are not limited to water use only.

The words "low pressure drop," when used herein to describe filters for use with the water sprayer of a faucet assembly, mean a pressure drop that will allow the shuttle valve to operate properly at the water pressures generally provided to a conventional sink.

As used herein, the term "nonwoven web" means a web or fabric having a structure of individual fibers or threads which are interlaid, but not in an identifiable manner as in a knitted or woven fabric. Nonwoven webs generally may be prepared by methods which are well known to those having ordinary skill in the art. Examples of such processes include, by way of illustration only, meltblowing, coforming, spunbonding, carding and bonding, air laying, and wet laying. Meltblowing, coforming, and spunbonding processes are exemplified by the following references, each of which is incorporated herein by reference:

(a) meltblowing references include, by way of example, U.S. Pat. No. 3,016,599 to R. W. Perry, Jr., U.S. Pat. No. 3,704,198 to J. S. Prentice, U.S. Pat. No. 3,755,527 to J. P.

Keller et al., U.S. Pat. No. 3,849,241 to R. R. Butin et al., U.S. Pat. No. 3,978,185 to R. R. Butin et al., and U.S. Pat. No. 4,663,220 to T. J. Wisneski et al. See, also, V. A. Wente, "Superfine Thermo-plastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No. 4, pp. 74–77 (1973);

(b) coforming references include U.S. Pat. No. 4,100,324 to R. A. Anderson et al. and U.S. Pat. No. 4,118,531 to E. R. Hauser; and (c) spunbonding references include, among others, U.S. Pat. No. 3,341,394 to Kinney, U.S. Pat. No. 3,655,862 to Dorschner et al., U.S. Pat. No. 3,692,618 to Dorschner et al., U.S. Pat. No. 3,705,068 to Dobo et al., U.S. Pat. No. 3,802,817 to Matsuki et al., U.S. Pat. No. 3,853,651 to Porte, U.S. Pat. No. 4,064,605 to Akiyama et al., U.S. Pat. No. 4,091,140 to Harmon, U.S. Pat. No. 4,100,319 to Schwartz, 4,340,563 to Appel and Morman, 4,405,297 to Appel and Morman, 4,434,204 to Hartman et al., U.S. Pat. No. 4,627,811 to Greiser and Wagner, and U.S. Pat. No. 4,644,045 to Fowells.

A "nonwoven charge-modified microfiber glass web" may be prepared from a fibrous web which incorporates glass fibers having a cationically charged coating thereon. Generally, such microfibers would be glass fibers having a diameter of about 10 microns or less. The coating includes a functionalized cationic polymer which has been crosslinked by heat; in other words, the functionalized cationic polymer has been crosslinked by heat after being coated onto the glass fibers. Such fibrous filter is prepared by a method which involves providing a fibrous filter which includes glass fibers, passing a solution of a functionalized cationic polymer crosslinkable by heat through the fibrous filter under conditions sufficient to substantially coat the fibers with the functionalized cationic polymer, and treating the resulting coated fibrous filter with heat at a temperature and for a time sufficient to crosslink the functionalized cationic polymer present on the glass fibers. The functionalized cationic polymer may be an epichlorohydrin-functionalized polyamine or an epichlorohydrin-functionalized polyamido-amine.

In general, when used as a filter media, a "charge-modified microfiber glass web" will contain at least about 50 percent by weight of glass fibers, based on the weight of all fibers present in the filter media. In some embodiments, essentially 100 percent of the fibers will be glass fibers. When other fibers are present, however, they generally will be cellulosic fibers, fibers prepared from synthetic thermoplastic polymers, or mixtures thereof.

As used herein, the terms "cationically charged" in reference to a coating on a fiber, particle, or web of fibers and "cationic" in reference to the functionalized polymer mean the presence in the respective coating and polymer of a plurality of positively charged groups. Thus, the terms "cationically charged" and "positively charged" are synonymous. Such positively charged groups typically will include a plurality of quaternary ammonium groups, but they are not necessarily limited thereto.

The term "functionalized" is used herein to mean the presence in the cationic polymer of a plurality of functional groups, other than the cationic groups, which are capable of crosslinking when subjected to heat. Thus, the functional groups are thermally crosslinkable groups. Examples of such functional groups include epoxy, ethylenimino, and episulfido. These functional groups readily react with other groups typically present in the cationic polymer. The other groups typically have at least one reactive hydrogen atom and are exemplified by amino, hydroxy, and thiol groups. It may be noted that the reaction of a functional group with another group often generates still other groups which are capable of reacting with functional groups. For example, the reaction of an epoxy group with an amino group results in the formation of a β-hydroxyamino group.

Thus, the term "functionalized cationic polymer" is meant to include any polymer which contains a plurality of positively charged groups and a plurality of other functional groups which are capable of being crosslinked by the application of heat. Particularly useful examples of such polymers are epichlorohydrin-functionalized polyamines and epichlorohydrin-functionalized polyamido-amines. Both types of polymers are exemplified by the Kymene® resins which are available from Hercules Inc., Wilmington, Del. Other suitable materials include cationically modified starches, such as RediBond, from National Starch.

As used herein, the term "thermally crosslinked" means the coating of the functionalized cationic polymer has been heated at a temperature and for a time sufficient to crosslink the above-noted functional groups. Heating temperatures typically may vary from about 50° C. to about 150° C. Heating times in general are a function of temperature and the type of functional groups present in the cationic polymer. For example, heating times may vary from less than a minute to about 60 minutes or more.

As discussed briefly above, a nonwoven charge-modified meltblown web may consist of hydrophobic polymer fibers, amphiphilic macromolecules adsorbed onto at least a portion of the surfaces of the hydrophobic polymer fibers, and a crosslinkable, functionalized cationic polymer associated with at least a portion of the amphiphilic macromolecules, in which the functionalized cationic polymer has been crosslinked. Crosslinking may be achieved through the use of a chemical crosslinking agent or by the application of heat. Desirably, thermal crosslinking, i.e., the application of heat, will be employed. In general, the amphiphilic macromolecules may be of one or more of the following types: proteins, poly(vinyl alcohol), monosaccharides, disaccharides, polysaccharides, polyhydroxy compounds, polyamines, polylactones, and the like. Desirably, the amphiphilic macromolecules will be amphiphilic protein macromolecules, such as globular protein or random coil protein macromolecules. For example, the amphiphilic protein macromolecules may be milk protein macromolecules. The functionalized cationic polymer typically may be any polymer which contains a plurality of positively charged groups and a plurality of other functional groups which are capable of being crosslinked by, for example, chemical crosslinking agents or the application of heat. Particularly useful examples of such polymers are epichlorohydrin-functionalized polyamines and epichlorohydrin-functionalized polyamido-amines. Other suitable materials include cationically modified starches.

The nonwoven charge-modified meltblown web may be prepared by a method which involves providing a fibrous meltblown filter media which includes hydrophobic polymer fibers, passing a solution containing amphiphilic macromolecules through the fibrous filter under shear stress conditions so that at least a portion of the amphiphilic macromolecules are adsorbed onto at least some of the hydrophobic polymer fibers to give an amphiphilic macromolecule-coated fibrous web, passing a solution of a crosslinkable, functionalized cationic polymer through the amphiphilic macromolecule-coated fibrous web under conditions sufficient to incorporate the functionalized cationic polymer onto at least a portion of the amphiphilic macromolecules to give a functionalized cationic polymer-coated fibrous web in which the functionalized cationic polymer is associated with at least a portion of the amphiphilic macromolecules, and treating the resulting coated fibrous filter with a chemical crosslinking agent or heat. Desirably, the coated fibrous filter will be treated with heat at a temperature and for a time sufficient to crosslink the functionalized cationic polymer.

In general, the present invention relates to a filtration device. More specifically, the present invention is directed to a fluid filter that is constructed from filter media wound into spiral layers around a core. The core is cylindrically shaped and has apertures within the surface through which fluid may flow. The core is open to fluid flow on one end, and closed to fluid flow on the other end. The filter may be used to filter a fluid flowing through the filter in either of two directions: The fluid may flow radially inward from the surface of the filter to the core; alternatively, the fluid may flow radially outward from the core to the surface of the filter. Multiple layers of filter media may be used to remove different undesired constituents from the unfiltered fluid. Additionally, by varying the structure, order, and number of layers formed by wrapping the filter media, embodiments of the present invention may be tailored to meet specific applications, to remove specific undesired constituents in a prescribed order, and to achieve a filter with a low pressure drop. The dimensions of the filtration device and the filter media used in its construction may also be varied to achieve a filter with a low pressure drop.

FIG. 1 depicts an embodiment of the present invention in which the arrows are used to indicate a fluid flowing in a direction that is radially inward. In this embodiment, unfiltered fluid enters the filtration device 10 through an unfiltered fluid inlet surface 12. The unfiltered fluid is then filtered as it flows through layers of filter media 14. Filtered fluid then flows through apertures 16 spaced intermittently in the surface of a core 18. Filtered fluid exits the filtration device 10 through a filtered fluid outlet 20.

Figure 2:
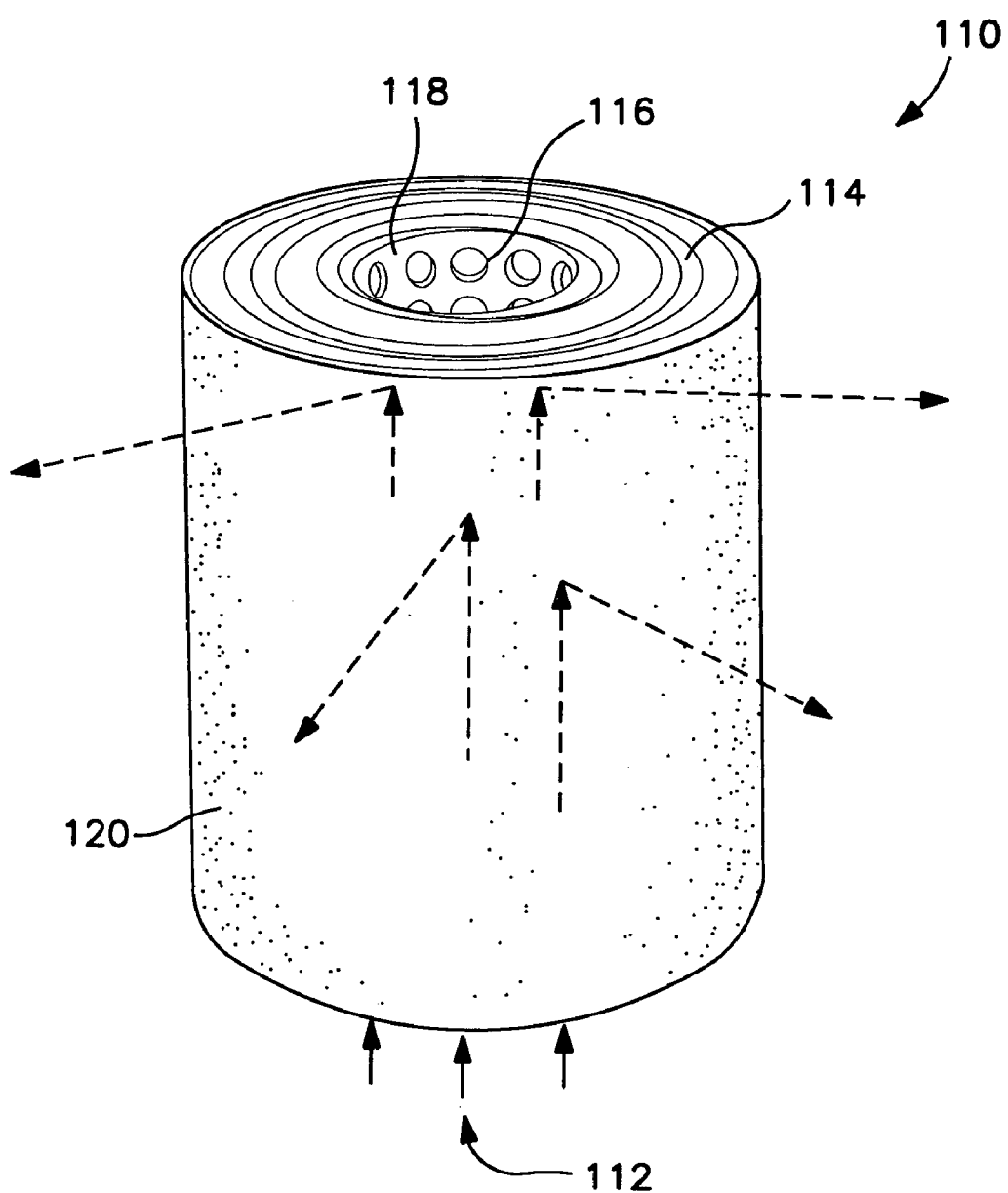
FIG. 2 is a perspective view of an embodiment of the present invention.

In another embodiment of the present invention, as depicted in FIG. 2, the fluid flows in a direction that is radially outward as indicated by the arrows. In this embodiment, unfiltered fluid enters the filtration device 110 through the unfiltered fluid inlet 112. The unfiltered fluid then flows through the apertures 116 spaced intermittently in the surface of the core 118. Unfiltered fluid from the apertures 116 is then filtered as it flows through the layers of filter media 114. Filtered fluid then exits the filtration device 110 by flowing through the filtered fluid outlet surface 120.

Figure 3:
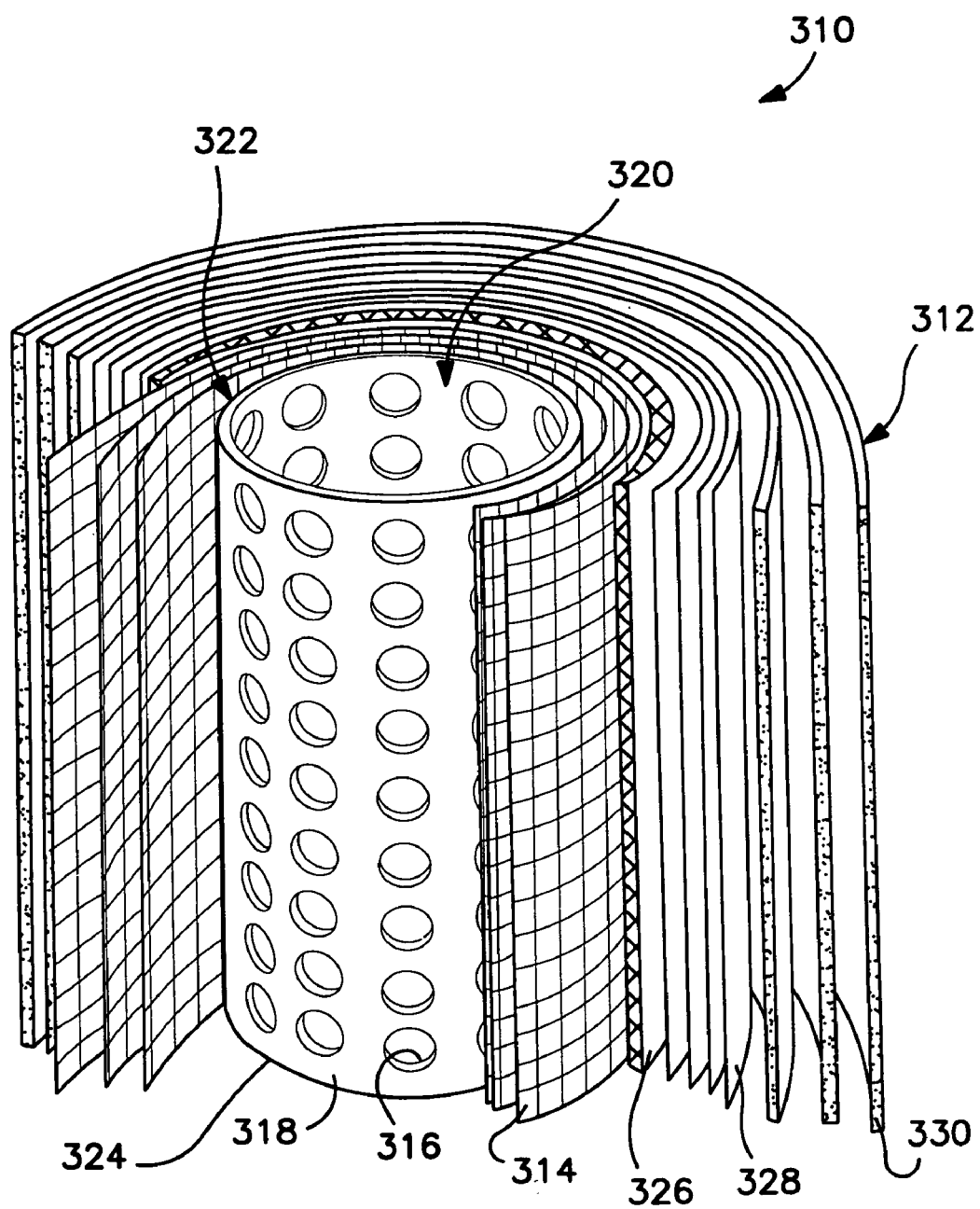
FIG. 3 is an exploded and partial cross-sectional view of an embodiment of the present invention.

FIG. 3 is an cross-sectional view of an embodiment of the present invention in which four different filter media are used for filtration. For flow that is radially inward, a filtration device 310 includes an unfiltered fluid inlet surface 312, through which unfiltered fluid may enter the filtration device 310. A first filter media 314 is in fluid communication with the unfiltered fluid inlet surface 312. The first filter media 314 is spirally wound and is positioned so that unfiltered fluid entering the filtration device 310 through the unfiltered fluid inlet surface 312 is directed to flow radially inward and through the first filter media 314.

The filtration device 310 includes a core 318 that is cylindrically shaped and has a surface defining apertures 316 that are spaced intermittently throughout the surface. The core 318 is in fluid communication with the spirally wound first filter media 314 and is positioned with respect thereto such that filtered fluid flowing radially inward from the first filter media 314 flows through the apertures 316 and into the core 318. The core 318 has a first end 322 and a second end 324. The first end 322 is open so that the filtered fluid may exit the core 318 through a filtered fluid outlet 320 that is in fluid communication with the core 318. The second end 324 is closed to prevent the flow of fluid through the second end 324 and to direct the flow of fluid to the first end 322.

Accordingly, during fluid filtration, the unfiltered fluid enters the filtration device 310 through the unfiltered fluid inlet surface 312. The unfiltered fluid flows though the unfiltered fluid inlet surface 312 and into the first filter media 314. Undesired constituents may be removed as the fluid passes through the first filter media 314. Filtered fluid from the first filter media 314 then enters the core 318 through the apertures 316. The filtered fluid may then flow from the first end 322 of the core 318 and exit the filtration device 310 through the filtered fluid outlet 320.

Referring again to FIG. 3, the unfiltered fluid inlet surface 312 may be the surface of the layer of filter media located on the outside of the filtration device as shown in FIG. 3. Alternatively, the unfiltered fluid inlet surface 312 may consist of a layer of material that holds the spirally wrapped filter media in a spiral shape around the core 318. For example, the unfiltered fluid inlet surface 312 may be constructed from a plastic mesh having large apertures through which the unfiltered fluid may flow. For the embodiment such as described above with FIG. 3 where unfiltered fluid flows radially inward, installations of the filtration device 310 must provide for unfiltered fluid flow to the unfiltered fluid inlet surface 312.

The first filter media 314 may be constructed from any filter media capable of being wrapped in spiral fashion. The filter media 314 may be constructed from a single material or may be constructed as a laminate of different materials. A variety of filter media are available which will filter specific undesired constituents from a fluid stream and which may be wrapped into spirals.

For example, one particular filter media that may be employed in the present invention is a media manufactured by K-X Industries under the name of PLEKX. This filter media includes three layers: A charge-modified layer is laminated onto both the top and bottom of a layer containing activated carbon. The thickness of the entire laminate is on the order of 0.050 inches. This filter media is flexible enough to be wrapped into spirals for the present invention. The PLEKX material may be used in water filtration applications where the activated carbon may remove strong odors and tastes from water. More specifically, activated charcoal may remove chlorine and sediment from water.

For those applications involving water filtration, the first filter media 314 may also be constructed from a filter media that removes, captures, kills, or deactivates microorganisms. Examples of materials that may be used for first filter media 314 are microporous materials such as a nonwoven meltblown web, a nonwoven microfiber glass web or various charge-modified media such as a nonwoven charge-modified meltblown web or a nonwoven charge-modified microfiber glass web. Various non-web materials may also be used including coated calcite, diatomaceous earth, or other particles. These materials are provided by way of example only; for water filtration, other filter media may be utilized for this first filter media 314 that kill or deactivate the microorganisms, provided these materials can be formed into a spiral shape. Generally, if microporous materials are employed for water filtration, such materials may have pore sizes that are 20 microns or less in size, and in some embodiments, pore sizes that are 10 microns or less in size. In other embodiments, the microporous materials will have a maximum pore size of 7.5 microns. These includes various microfiber glass configurations as well as various nonwoven webs.

In additional embodiments of the present invention, additional spirally wrapped filter media may be added to the filtration device 310. For example, referring again to FIG. 3, an embodiment may include a second filter media 326 in fluid communication with the unfiltered fluid inlet surface 312. The second filter media 326 is spirally wound around the first filter media 314 so that fluid flowing from the unfiltered fluid inlet surface 312 flows radially inward through the second filter media 316 and into the first filter media 314. The second filter media 326 may be wrapped several times around the first filter media 314, or may include a single wrap as depicted in FIG. 3. The second filter media 326 may be constructed from the same materials as other filter media in the filter, or may be constructed from a different material designed to remove different constituents than the other filter media.

Referring again to FIG. 3, an embodiment may include a third filter media 328 in fluid communication with the unfiltered fluid inlet surface 312. The third filter media 328 is spirally wound around the second filter media 326 so that fluid flowing from the unfiltered fluid inlet surface 312 flows radially inward through the third filter media 328 and into the second filter media 326. The third filter media 328 may be wrapped several times around the second filter media 326 as depicted in FIG. 3, or may include a single wrap as depicted with the second filter media 326. The third filter media 328 may be constructed from the same materials as other filter media in the filter, or may be constructed from a different material designed to remove different constituents than the other filter media.

Similarly, and as depicted again in FIG. 3, an embodiment may include a fourth filter media 330 in fluid communication with the unfiltered fluid inlet surface 312. The fourth filter media 330 is spirally wound around the third filter media 328 so that fluid flowing from the unfiltered fluid inlet surface 312 flows radially inward through the fourth filter media 330 and into the third filter media 328. The fourth filter media 330 may be wrapped several times around the third filter media 328 as depicted in FIG. 3, or may include a single wrap as depicted with the second filter media 326. The fourth filter media 330 may be constructed from the same materials as other filter media in the filter, or may be constructed from a different material designed to remove different constituents than the other filter media.

Additional layers of different spiral wound filter media may be added in addition to the four described in the above using the teachings contained herein. Each layer of filter media may be constructed from a new material, or may be the same as the other layers of filter media. Also, the additional layers of filter media may not be spirally wrapped. For example, a layer of filter media in the form of beads or particles may be added at the interior or exterior of the first filter media 314. Similarly, such a filter media could be used within the layers of spirally wound filter media. These serve only as a few examples; multiple variations are possible using the teachings disclosed herein.

The core 318 forms the center or base of the filtration device 310 about which the filter media may be wrapped. The core 318 may be constructed of any material suitable for the particular filtering application desired. Accordingly, the core may be constructed from various metals, plastics, or the like. The apertures 316 that are intermittently spaced in the surface of the core 318 may be circular, as shown in FIG. 3, or may be shaped as desired provided the flow of filtered fluid through the surface of the core 318 is not impeded and the core 318 remains dimensionally stable. The core 318 may have only one aperture or may have multiple apertures that are not intermittently spaced. Finally, the core 318 need not be cylindrically-shaped. By way of example only, the core 318 may take the shape of a sphere, cone, rectangle, square, and the like.

The pressure drop imparted by the filtration device 310 may be affected by the identity and construction of the filter media selected. For example, a filter media having a relatively small pore size and large thickness may create a greater pressure drop than one with larger pores of smaller thickness. In addition, the pressure drop may also be affected by the number of spirals used within the filter. For example, each individual filter media may be wrapped into spirals that create several layers through which the fluid flows during filtration. Additionally, each additional filter media adds additional layers to the filter. Generally, each additional layer formed by a spiral increases the pressure drop that may be expected during filtration. Thus, the pressure drop achieved by the filter may be manipulated by varying the identity of the filter media, the construction of the filter media, or the construction of the spirally wound filter from the filter media.

The present invention is not limited to the relative dimensions depicted in FIG. 3. The height, length, and diameter of the filtration device 310 may be varied depending upon the application. Generally, changing these dimensions may also affect the pressure drop across the filter as well as the useful life of the filter media.

FIG. 4 depicts an embodiment of the present invention installed into the water sprayer connected to the faucet assembly of a conventional sink. A low pressure drop, filtration device 10 is located in a water sprayer 100. Unfiltered water is provided to the water sprayer 100 from a faucet assembly 102 by a flexible conduit 104. The faucet assembly 102 is installed into a conventional sink 106. Accordingly, the low pressure drop, filtration device may be used in conjunction with the faucet assembly 102 of a conventional sink 106 to provide filtered water.

Generally, the faucet assembly 102 includes a shuttle valve within the assembly. When the user opens either of the supply valves 108 of the faucet assembly, the shuttle valve directs the flow of unfiltered water to the water outlet 107 of the faucet or spigot 109. When the user activates the water sprayer 100, the shuttle valve automatically redirects the flow of unfiltered water to the sprayer 100. Proper operation of the shuttle valve is dependent upon the water pressure and flow rate of the water supply.

Fluid filtration may introduce some degree of pressure drop in any given fluid stream being filtered regardless of whether it involves filtration with the present invention or any other currently available filter. As a result, the shuttle valve within the faucet assembly 102 of a conventional sink 106 may not function properly when an additional pressure drop is introduced into the water sprayer 100 because the pressure of the existing water supply may not be sufficient. The present invention includes embodiments to circumvent this limitation of the conventional shuttle valve by providing a filtration device 10 that may be configured for use with the water sprayer 100 at a pressure drop that does not interfere with the proper operation of the shuttle valve. For example, using the filter media manufactured by K-X Industries under the name of PLEKX as described above, pressure drops as low as 3 pounds per square inch are obtainable with embodiments of the present invention that are also suitable for use in water filtration. This low pressure drop does not affect the proper operation of the shuttle valve at the water pressures typically provided to the conventional faucet assembly 102. Accordingly, the low pressure drop, filtration device of the present invention may be structured into the water sprayer 100 or flexible conduit 104 of a conventional sink 106 such that filtered water may be provided from the water sprayer 100.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

What is claimed is:

1. A filtration device, comprising:
   an unfiltered fluid inlet surface, through which unfiltered fluid may enter the filtration device;
   a first filter media in fluid communication with the unfiltered fluid inlet surface, said first filter media being spirally wound and being positioned with respect to said unfiltered fluid inlet surface so that unfiltered fluid entering the filtration device through the unfiltered fluid inlet surface is directed to flow radially inward and through the first filter media, said first filter media being spirally wound with generally complete overlap and contact between adjacent layers such that edges of said layers are generally aligned in a common plane, said first filter media comprising a laminate of a plurality of different material layers, wherein at least one of said material layers in said laminate comprises activated carbon;
   a core in fluid communication with the first filter media, said core having a surface that defines apertures, said core being positioned with respect to said spirally wound first filter media so that filtered fluid flowing radially inward from the first filter media flows into the core, said core having a first end and a second end with said first end being open so that filtered fluid may exit the core and with said second end being closed so that the flow of fluid through the second end is prevented; and
   a filtered fluid outlet in fluid communication with the first end of the core so that filtered fluid flowing from the first end of the core exits the filtration device through the filtered fluid outlet.

2. A filtration device as in claim 1, further comprising a second filter media in fluid communication with the unfiltered fluid inlet surface, said second filter media being spirally wound around the first filter media so that fluid flowing from the unfiltered fluid inlet surface flows radially inward through the second filter media and into the first filter media.

3. A filtration device as in claim 2, further comprising a third filter media in fluid communication with the unfiltered fluid inlet surface, said third filter media being spirally wound around the second filter media so that fluid flowing from the unfiltered fluid inlet surface flows radially inward through the third filter media and into the second filter media.

4. A filtration device as in claim 3, further comprising a fourth filter media in fluid communication with the unfiltered fluid inlet surface, said fourth filter media being spirally wound around the third filter media so that fluid flowing from the unfiltered fluid inlet surface flows radially inward through the fourth filter media and into the third filter media.

5. A filtration device as in claim 1, wherein the first filter media a charge-modified material layer laminated to said activated carbon layer.

6. A filtration device as in claim 5, wherein the filtration device is configured for installing into a water sprayer of a sink assembly so that filtered water may be provided from the sprayer.

7. A filtration device as in claim 1, further comprising a second filter media in fluid communication with the unfiltered fluid inlet surface, said second filter media positioned so that fluid flowing from the unfiltered fluid inlet surface flows radially inward through the second filter media and into the first filter media.

8. A filtration device as in claim 1, wherein said core is cylindrically shaped.

9. A filtration device as in claim 1, wherein the filtration device is configured for installing into a water sprayer of a sink assembly so that filtered water may be provided from the sprayer.

10. A filtration device, comprising:
    an unfiltered fluid inlet, through which unfiltered fluid may enter the filtration device;
    a core in fluid communication with the unfiltered fluid inlet, said core having a surface defining apertures therein so that unfiltered fluid may flow from the unfiltered fluid inlet and radially outward through the core;
    said core having a first end and a second end, wherein said first end is open so that unfiltered fluid may enter the core and wherein said second end is closed so that flow of fluid through the second end is prevented;
    a first filter media in fluid communication with the core, said filter media being spirally-wound around the surface of the core so that fluid flowing from the core may flow radially outward through the apertures and into the first filter media, said first filter media being spirally wound with generally complete overlap and contact between adjacent layers such that edges of said layers are generally aligned in a common plane, said first filter media comprising a laminate of a plurality of different material layers, wherein at least one of said material layers in said laminate comprises activated carbon; and
    a filtered fluid outlet surface in fluid communication with the first filter media so that filtered fluid from the first filter media may exit the filtration device through the filtered fluid outlet surface.

11. A filtration device as in claim 10, further comprising a second filter media in fluid communication with the filtered fluid outlet surface, said second filter media being spirally wound around the surface of the first filter media so that filtered fluid from the first filter media may flow radially outward, through the second filter media, and then may exit the filtration device through the filtered fluid outlet surface.

12. A filtration device as in claim 11, further comprising a third filter media in fluid communication with the filtered fluid outlet surface, said third filter media being spirally wound around the surface of the second filter media so that filtered fluid from the second filter media may flow radially outward, through the third filter media, and then may exit the filtration device through the filtered fluid outlet surface.

13. A filtration device as in claim 12, further comprising a fourth filter media in fluid communication with the filtered fluid outlet surface, said fourth filter media being spirally wound around the surface of the third filter media so that filtered fluid from the third filter media may flow radially outward, through the fourth filter media, and then may exit the filtration device through the filtered fluid outlet surface.

14. A filtration device as in claim 10, wherein the first filter media comprises a charge-modified material layer laminated to said activated carbon layer.

15. A filtration device as in claim 14, wherein the filtration device is configured for installing into the water sprayer of a sink assembly so that filtered water may be provided from the sprayer.

16. A filtration device as in claim 10, further comprising a second filter media in fluid communication with the filtered fluid outlet surface, said second filter media being positioned with respect to the first filter media so that filtered fluid from the first filter media may flow radially outward, through the second filter media, and then may exit the filtration device through the filtered fluid outlet surface.

17. A filtration device as in claim 10, wherein said core is cylindrically shaped.

18. A filtration device as in claim 10, wherein the filtration device is configured for installing into the water sprayer of a sink assembly so that filtered water may be provided from the sprayer.

19. A filtration device, comprising:
a housing defining an interior volume, an inlet for allowing fluid to be filtered to enter the volume, and an outlet for filtered fluid to exit the volume;
a core located within the volume, the core defining a chamber; at least one aperture allowing fluid communication through the core and into the chamber; and an exit orifice in fluid communication with the outlet; and,
a spirally wound filtration media located within the volume and configured so that fluid entering the volume from the inlet is directed to flow radially inward and through the filtration media, through the core, and into the chamber and out of the outlet, said filtration media being spirally wound with generally complete overlap and contact between adjacent layers such that edges of said layers are generally aligned in a common plane, said filtration media comprising a plurality of different types of wound media with at least one of said types of media comprising activated carbon; and
wherein the spirally wound filtration media comprises a laminate of filter media.

\* \* \* \* \*